United States Patent [19]

Layton

[11] 4,410,642
[45] Oct. 18, 1983

[54] COATING COMPOSITIONS

[75] Inventor: John M. Layton, Wellingborough, England

[73] Assignee: Scott Bader Company Limited, Wollaston, England

[21] Appl. No.: 375,135

[22] PCT Filed: Aug. 6, 1981

[86] PCT No.: PCT/GB81/00157
§ 371 Date: Apr. 5, 1982
§ 102(e) Date: Apr. 5, 1982

[87] PCT Pub. No.: WO82/00653
PCT Pub. Date: Mar. 4, 1982

[30] Foreign Application Priority Data

Aug. 15, 1980 [GB] United Kingdom ............... 8026663

[51] Int. Cl.³ .......................................... C08L 67/06
[52] U.S. Cl. ................................. 523/122; 523/512
[58] Field of Search ............... 523/122, 512; 524/440; 106/1.18, 15.05

[56] References Cited

U.S. PATENT DOCUMENTS

| | | | |
|---|---|---|---|
| 3,033,809 | 5/1962 | Saroyan et al. | 523/122 |
| 3,219,505 | 11/1965 | Hilding | 428/242 |
| 3,274,137 | 9/1966 | Saroyan et al. | 523/122 |
| 4,081,423 | 3/1978 | Hardenfelt | 523/512 |
| 4,197,233 | 4/1980 | Marshall | 523/122 |
| 4,270,953 | 6/1981 | Nakagawa et al. | 524/440 |
| 4,314,850 | 2/1982 | Watanabe et al. | 106/15.05 |

OTHER PUBLICATIONS

"Synthetic Addition Products," *Polymers & Resins*, B. Golding (Van Nostrand 1959), p. 403.
*Encyclopedia of Polymer Science and Technology*, vol. 12, (John Wiley & Sons, Inc., 1970), "Resin and Resin Derivatives", pp. 141–142.

*Primary Examiner*—Lewis T. Jacobs
*Attorney, Agent, or Firm*—Townsend and Townsend

[57] ABSTRACT

A composition for anti-fouling coatings includes 20 to 80% of heavy metal particles such as copper or a copper alloy powder. To prevent instability on storage the resin matrix has a low acid value, preferably not greater than 5 mg KOH/g. The resin is one of a type cured by a free-radical-initiated cross-linking mechanism such as an unsaturated polyester, vinyl ester or urethane acrylate.

10 Claims, No Drawings

COATING COMPOSITIONS

FIELD OF THE INVENTION

This invention relates to coating compositions for marine structures, to such structures and to methods of making them.

BACKGROUND OF THE INVENTION

The use of certain heavy metals, especially copper and copper alloys in antifouling coatings for ships and other marine structures is well known.

The use of gelcoats based on unsaturated polyester resins for GRP marine structures such as boats is also well known. However it is also well known that copper and its compounds are efficient inhibitors for unsaturated polyester resins, the effect first having been noticed when attempts were made to embed electrical windings in polyesters, and also having been noticed when GRP tubes were wound on brass mandrels and their inner surface was found to be discoloured and undercured.

This inhibiting effect was put to practical use by the use of small quantities (0.25-10 ppm Cu) of oil-soluble copper salts, such as the naphthenate, to improve the storage stability of liquid unsaturated polyester resins (G.B. Pat. No. 834,286).

Attempts to overcome the problem of preventing inhibition of cure in the presence of copper are illustrated by G.B. Pat. No. 967,921 which covers the addition of oxalic acid, by the use of hydroxy polycarboxylic acids such as tartaric acid to prevent inhibition in contact with copper (U.S. Pat. No. 2,566,739), and by G.B. Pat. No. 1,526,597 which covers the addition of benzotriazole to the resin to get a good bond between copper foil and glass-reinforced polyester in the manufacture of copper clad laminates for electrical purposes.

SUMMARY OF THE INVENTION

According to the invention, polyester and similarly curable resins are stable in the presence of 20–80% by weight of copper or copper alloy powder if they have an acid value below about 10 mg KOH/g, preferably not greater than 5.

In fact such compositions cure with a tack-free air surface. Such a tack-free surface is extremely surprising in view of the expected inhibiting effect of copper and in view of the fact that acid values of the order of 20–30 are much more normal. It is furthermore remarkable that when such normal resins are mixed with copper powder (which is suggested in U.S. Pat. No. 3,219,505), they prove to be unstable and lumpy once the peroxide is added to the system after storage. The similarly curable resins usable in the invention are those cured by a free-radical-initiated cross-linking mechanism such as vinyl esters and urethane acrylates. The compositions according to this invention can be used as fouling-resistant coatings on structures for use in marine environments e.g. boats, buoys, platforms, pontoons, etc. Abrasion of the surface to expose copper particles is not necessary when high levels of copper are used although it is preferable to do so when lower levels of copper powder or copper alloy (below around 30% by weight) are employed.

DETAILED EXPLANATION OF THE INVENTION

The resins are most commonly unsaturated polyester resins which are manufactured by the combination of an $\alpha, \beta$-unsaturated dicarboxylic acid or anhydride, with or without the addition of a saturated dicarboxylic acid or anhydride and one or more glycols. The resultant condensate is dissolved in an unsaturated vinyl compound so that the liquid resin is 100% reactive and can be converted to a rigid crosslinked structure at room temperature by the addition of an organic peroxide in the presence of a promoter.

Typical examples of the various groups of compounds that can be used are:

(i) unsaturated acids/anhydrides—maleic anhydride, fumaric acid, itaconic acid.
(ii) saturated acids/anhydrides—phthalic anhydride, isophthalic acid, terephthalic acid, tetrahydrophthalic anhydride, tetrahalophthalic anhydrides, chlorendic acid/anhydride, adipic acid, sebacic acid.
(iii) glycols—ethylene glycol, 1.2 propylene glycol, 1.3 propylene glycol, diethylene glycol, dipropylene glycol, neopentyl glycol, dibromoneopentyl glycol, Dianol 33 ®, Dianol 22 ®.
(iv) vinyl type monomers—styrene, vinyl toluene, chlorostyrene, bromostyrene, methyl methacrylate, ethylene glycol dimethacrylate.
(v) curing system—methyl ethyl ketone peroxide+cobalt soaps, cyclohexanone peroxide+cobalt soaps, acetylacetone peroxide+cobalt soaps, benzoyl peroxide+NN dialkyl arylamines.

Other resins that can be used are the so-called vinyl esters and urethane acrylates. Both of these have low acid values and are dissolved in vinyl type monomers such as styrene. The former are made by the reaction of acrylic or methacrylic acid with polyepoxides whilst the latter are the reaction products of di- or poly hydroxy compounds (which may be polymeric), di- or poly isocyanates and hydroxy alkyl acrylates or methacrylates.

The copper or copper alloy powder used in this invention can be of any suitable particle size and shape but the preferred material is a copper or copper alloy powder which passes 100, and better still, 300 mesh (British Standard) and is irregular in shape.

Other materials may be added to the gelcoats to make them suitable for use, e.g. thixotropic agents such as fumed silicas sold under the trade marks Aerosil ® and Cab-O-Sil ®, and the materials may be coloured by the use of suitable pigments and dyestuffs.

Preferred amounts of particulate copper or alloy are in the range 20 to 80% by weight of the total composition, more particularly 30–75% by weight. Any slight segregation and settling of the powder in the gelcoat once applied, tending to increase the concentration of the metal towards the lower face of the gel, will not be objectionable.

The invention is not limited to gel coats; use of the compositions as flow coats (a finishing coat on an exposed face of the substrate) on GRP and other substrates such as steel or cement also show excellent properties. There is no reason why the compositions described should be limited to marine structures as they could equally be used for decorative purposes e.g. gel coats on cladding panels.

EXAMPLE 1

Comparative

A gelcoat was prepared using the following formulation:

CRYSTIC®390 (a polyester resin based on isophthalic acid, maleic anhydride, propylene and diethylene glycols, of acid number approximately 17 to 20): 270 p.b.w.
Styrene: 30 p.b.w.
Cab-O-Sil® (thixotropic agent): 10 p.b.w.
Cobalt octoate (12% Co): 1.7 p.b.w.
Copper powder (100 mesh irregular): 727.3 p.b.w.

This formulation was of the correct viscosity to give good brushing characteristics and when first tested gave the required gelation time at 25° C. upon addition of 2% by weight-methyl ethyl ketone peroxide (MEKP). It was apparently stable in storage for several weeks without separation but on adding MEKP to the stored material it quickly became lumpy and impossible to brush out. Changes in the grade of MEKP or its substitution by cyclohexanone peroxide or acetyl-acetone peroxide did not overcome the problem.

EXAMPLE 2

A gelcoat was prepared as in Example 1 except that the CRYSTIC®390 was replaced by CRYSTIC®D3402, an isophthalic acid-based resin similar to CRYSTIC®390 except that it has an acid value below 10 mgKOH/g as against 17-20 mgKOH/g for CRYSTIC®390. This material was storage stable for several weeks and did not exhibit lumpiness when peroxide catalysts such as those mentioned in Example 1 were added. A laminate was made by coating a mould with the composition of Example 2 and after gelation three layers of 450 g/m² glass mat were laid up on it using CRYSTIC®196 resin without added copper but catalysed in the same manner. The laminate was exposed to marine fouling without abrasion and showed no substantial signs of fouling after 2 years immersion.

EXAMPLE 3

Preparation and use as a gelcoat in a mould with Cu powder of 300 mesh

A gelcoat was prepared as below:

CRYSTIC®D3402: 270 p.b.w.
Styrene: 30 p.b.w.
Cab-O-Sil (thixotropic agent): 10 p.b.w.
Cobalt octoate (12% Co): 1.7 p.b.w.
Copper powder (300 mesh irregular): 727.25 p.b.w.

This was catalysed with 2% by weight MEKP and brushed out to a thickness of 0.015" when no striations were apparent. When gelled a backing laminate was laid down consisting of 3 layers of 450 g/m² chopped strand glass mat with CRYSTIC 406 PA catalyst with 2% by weight of MEKP. The ratio of resin to glass was 3:1 by weight.

The cured laminates were tested for gelcoat strain to failure on bending and Gardner impact when satisfactory figures of 1.35% and 0.89J were obtained. A similar constructed laminate with a gelcoat without the copper gave figures of 1.32% and 0.79J showing little effect on these impact and strain properties, demonstrating that the presence of copper does not have the expected effect of reducing them, especially of reducing the strain to failure.

Laminates showed no evidence of marine fouling after 3 months immersion during the summer whereas a control having no copper showed pronounced fouling.

EXAMPLE 4

A Gelcoat was made as below, with approx. 30% Cu in place of the approx. 70% Cu of Ex. 1–3

Crystic®D3402: 270 p.b.w.
Styrene: 30 p.b.w.
Cab-O-Sil® (thixotrope): 10 p.b.w.
Cobalt Octoate (12% Co): 1.7 p.b.w.
Copper Powder (100 mesh irregular): 133.6 p.b.w.

This was used in making a laminate as described in Example 3.

Before exposure to marine fouling half the laminate had the gelcoat surface abraded, to expose copper particles and the other half was not abraded. After exposure to marine fouling for 18 months the abraded sample showed less fouling than the non-abraded sample.

EXAMPLE 5

This is the presently preferred embodiment of the invention because of the very low acid value of the resin matrix.

A very low acid value polyester resin was made by condensing propylene glycol and isophthalic acid at 210° C. to an acid value of 30±3 mg KOH/g. Maleic anhydride was then added and the reaction continued to an acid value of 30±3 mg KOH/g. The resin was cooled to 180° C. and sufficient Cardura E10 (a glycidyl ester of versatic acid) added to react with the remaining carboxyl groups in the resin. When the acid value was below 5 the resin was cooled and blended with styrene monomer containing toluhydroquinone as inhibitor. The final resin solution had a viscosity of 7.9 poise at 25° C., a solids content of 66.4% and an acid value of 1 mg/KOH/g. This was converted to a gelcoat as below:

Resin: 270 p.b.w.
Styrene: 30 p.b.w.
Cab-O-Sil® (thixotrope): 10 p.b.w.
Cobalt Octoate (12% Co): 1.7 p.b.w.
Cupronickel Powder (100 mesh irregular): 727.25 p.b.w.

The composition was stable on storage for three months and did not show any signs of the formation of lumps on addition of MEKP after that storage. Similar results are obtained when the metal content is decreased to approx. 55% in place of the 70% of the formulation given.

EXAMPLE 6

A gelcoat was made from a urethane acrylate resin based on a caprolactone diol, isophorone di-iso-cyanate and hydroxy ethyl acrylate. This was dissolved in styrene to give a 70 percent solids solution with an acid value below 1 mg KOH/g.

The gelcoat formulation was:

Urethane acrylate resin as above: 270 p.b.w.
Cab-O-Sil® (thixotrope): 11 p.b.w.
Cobalt Octoate (12% Co): 1.7 p.b.w.

Polyethylene Glycol 6000: 0.05 p.b.w.
Copper powder (100 mesh irregular): 700 p.b.w.

This composition was stable for at least three months showing no discolouration and no formation of lumps when catalysed with MEKP after that storage. Similar results are obtained if the copper powder content is decreased to approx. 50 and approx. 60% of the total composition in place of the approx. 70% of the formulation given.

EXAMPLE 7

A gelcoat was made from a vinyl ester resin as follows:

Derakane ®4 11–45 (a): 270 p.b.w.
Cab-O-Sil ® (thixotrope): 11 p.b.w.
Cobalt Octoate (12% Co): 1.7 p.b.w.
Polyethene Glycol 6000: 0.1 p.b.w.
Copper powder (100 mesh): 700 p.b.w.

(a)A vinyl ester made by Dow Chemical Co. Acid value 5 mg KOH/g

The composition was stable on storage and exhibited no formation of lumps on the addition of MEKP after that storage.

EXAMPLE 8

Use as A Coating on a Substrate

The gelcoat composition of Example 3 was used as a coating. A conventional cured GRP laminate was solvent wiped and lightly abraded and a 0.4 mm thick layer of the catalysed gelcoat of Example 3 applied. After curing, its surface was not tacky, the applied layer had good adhesion and no deterioration was noticeable after several weeks' immersion in sea water.

Similar coatings of the gelcoat on primed aluminium, mild steel, wood, cement and masonry also showed no signs of loss of adhesion in laboratory immersion tests. The gelcoat compositions of Examples 2 and 4 to 7 can equally be used as such coatings.

British Standard Meshes are referred to above; British Standard mesh 100 has a nominal aperture of 0.152 mm and British Standard Mesh 300 a nominal aperture of 0.053 mm; heavy metal particles of a size lying between or (within reason) outside this range may be used in the present invention.

I claim:

1. A composition for use as an anti-fouling coating on a substrate, the composition including particles of a heavy metal selected from the group consisting of copper and copper alloys to give fouling resistance and a resin comprising an unsaturated polymer and a monomer copolymerizable therewith, which resin is curable by a free-radical-initiated crosslinking mechanism and has an acid value of less than about 10 mg KOH/g.

2. A composition according to claim 1, wherein the particles are in powder form, which powder is present in the range 30 to 75% by weight of the total composition.

3. A composition according to claim 1 or claim 2, wherein the resin is selected from the group consisting of unsaturated polyester, vinyl ester and urethane acrylate resins.

4. A composition according to claim 1 or claim 2, wherein the acid value is less than about 5 mg KOH/g.

5. A composition according to claim 1 or claim 2, wherein the free-radical initiator is selected from the group consisting of methyl ethyl ketone peroxide, acetyl acetone peroxide and cyclohexanone peroxide.

6. A substrate with an anti-fouling coating, the coating including particles of a heavy metal selected from the group consisting of copper and copper alloys, which particles are distributed in a cured resin matrix formed by the addition of a free-radical initiator to a resin composition, the resin of the composition comprising an unsaturated polymer and a monomer copolymerizable therewith and the resin having an acid value less than about 10 mg KOH/g.

7. A substrate according to claim 6, wherein the substrate is a marine structure.

8. A method of forming a substrate with an anti-fouling coating including particles of a heavy metal selected from the group consisting of copper and copper alloys distributed in a cured resin matrix which includes bonding together the coating and the substrate, the coating being a resin composition the resin of which comprises an unsaturated polymer and a monomer copolymerizable therewith, which resin is curable by a free-radical-initiated crosslinking mechanism characterized in that the resin of the composition has an acid value lower than about 10 mg KOH/g and in that upon addition of the free radical initiator the composition remains evenly spreadable.

9. A method according to claim 8 wherein the coating is applied as a gelcoat and the substrate is formed on the gelcoat.

10. In a composition for use as an anti-fouling coating on a substrate, the composition including particles of a heavy metal selected from the group consisting of copper and copper alloys to give fouling resistance and a resin comprising an unsaturated polymer and a monomer copolymerizable therewith, which resin is curable by a free-radical-initiated crosslinking mechanism, the improvement comprising said resin having an acid value of less than about 10 mg KOH/g.

* * * * *